(12) United States Patent
Yang

(10) Patent No.: US 10,333,248 B2
(45) Date of Patent: Jun. 25, 2019

(54) CHARGING RECEPTACLE, CHARGING PLUG AND CHARGING SYSTEM

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventor: Gang Yang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 40 days.

(21) Appl. No.: 15/539,987

(22) PCT Filed: Jan. 13, 2016

(86) PCT No.: PCT/CN2016/070803
§ 371 (c)(1),
(2) Date: Jun. 26, 2017

(87) PCT Pub. No.: WO2017/028487
PCT Pub. Date: Feb. 23, 2017

(65) Prior Publication Data
US 2017/0346219 A1 Nov. 30, 2017

(30) Foreign Application Priority Data
Aug. 18, 2015 (CN) .......................... 2015 1 0506310

(51) Int. Cl.
*H02J 7/00* (2006.01)
*H01R 13/62* (2006.01)
(Continued)

(52) U.S. Cl.
CPC ......... *H01R 13/6205* (2013.01); *H01F 7/206* (2013.01); *H01R 13/635* (2013.01);
(Continued)

(58) Field of Classification Search
CPC ....... Y02E 60/12; H02J 7/0042; H02J 7/0045; H01M 10/46; H01M 10/44
(Continued)

(56) References Cited

U.S. PATENT DOCUMENTS 8,393,423 B2 * 3/2013 Gwozdek ................ B60T 17/18
180/65.27
9,056,555 B1 * 6/2015 Zhou .................... B60L 11/1827
(Continued)

FOREIGN PATENT DOCUMENTS

CN 101860047 A 10/2010
CN 103368216 A 10/2013
(Continued)

OTHER PUBLICATIONS

Office Action in Chinese Application No. 201510506310.5 dated Aug. 2, 2017, with English translation.
(Continued)

*Primary Examiner* — Arun C Williams
(74) *Attorney, Agent, or Firm* — Womble Bond Dickinson (US) LLP

(57) ABSTRACT

The present disclosure provides a charging receptacle and a charging plug, which cooperate with each other and comprise a receptacle ejection device and a plug ejection device respectively for automatically separating the charging receptacle from the charging plug after charging of the apparatus to be charged is completed. The present disclosure further provides a charging system comprising the charging receptacle and the charging plug as described above.

12 Claims, 3 Drawing Sheets

(51) Int. Cl.
  *H01F 7/20* (2006.01)
  *H01R 13/635* (2006.01)
  *H01R 13/703* (2006.01)
  *H01R 13/713* (2006.01)

(52) U.S. Cl.
  CPC ....... *H01R 13/703* (2013.01); *H01R 13/7132* (2013.01); *H02J 7/0045* (2013.01); *H01F 2007/208* (2013.01)

(58) Field of Classification Search
  USPC .......................................................... 320/107
  See application file for complete search history.

(56) References Cited

U.S. PATENT DOCUMENTS

| | | | | |
|---|---|---|---|---|
| 2010/0013433 | A1* | 1/2010 | Baxter | B60L 11/1816 320/109 |
| 2010/0261360 | A1 | 10/2010 | Li | |
| 2011/0316400 | A1* | 12/2011 | Bianco | G07F 9/10 312/237 |
| 2012/0232761 | A1* | 9/2012 | Charnesky | H01R 13/6272 701/49 |
| 2013/0078841 | A1* | 3/2013 | Ferguson | H01R 13/6397 439/350 |
| 2013/0169215 | A1 | 7/2013 | Sakai et al. | |
| 2013/0260584 | A1 | 10/2013 | Zhang et al. | |
| 2013/0303014 | A1* | 11/2013 | Takagi | H01R 13/6275 439/350 |
| 2015/0091388 | A1* | 4/2015 | Golko | H01F 7/206 307/104 |
| 2016/0013682 | A1* | 1/2016 | Ostendorf | H02J 7/0042 320/108 |

FOREIGN PATENT DOCUMENTS

| | | |
|---|---|---|
| CN | 105186214 A | 12/2015 |
| JP | S63316297 A | 12/1988 |
| TW | 201433045 A | 8/2014 |

OTHER PUBLICATIONS

International Search Report with English language translation, dated May 10, 2016, International Application No. PCT/CN2016/070803 (15 pages).

Chinese Office Action with English language translation, dated Feb. 4, 2017, Chinese Application No. 201510506310.5 (10 pages).

* cited by examiner

CHARGING RECEPTACLE, CHARGING PLUG AND CHARGING SYSTEM

RELATED APPLICATIONS

The present application is the U.S. national phase entry of PCT/CN2016/070803, with an international filing date of Jan. 13, 2016, which claims the benefit of Chinese Patent Applications No. 201510506310.5, filed on Aug. 18, 2015, the entire disclosures of which are incorporated herein by reference.

FIELD

The present disclosure relates to the field of charging apparatuses, and more specifically to a charging receptacle, a charging plug and a charging system.

BACKGROUND

With the continuous development in the technical field of chargeable apparatuses, a variety of chargeable apparatuses is emerging. Chargeable apparatuses are widely used in mobile office, entertainment, business and other applications, and greatly enrich people's lives. As a key factor in the realization of a chargeable apparatus, the battery of the chargeable apparatus is attracting more and more attention. In an existing chargeable apparatus (such as mobile phone, tablet computer, etc), when charging the battery of the apparatus, a USB wire is mostly used for charging. When charging of the battery is completed, the charging process of the battery is stopped by the system of the chargeable apparatus. However, there is a hidden danger if charging of the battery is stopped depending on the system of the chargeable apparatus when charging is completed. For example, when the system of the chargeable apparatus makes an incorrect judgment or the system fails, the charging system may still continue to charge the battery after charging of the battery is completed. In this case, it may cause the battery to generate excess heat, deform, burn or even explode, which may damage the battery and the chargeable apparatus, and even cause a threat to the user's personal safety.

Accordingly, there is a need in the art for technologies that can safely charge a chargeable apparatus.

SUMMARY

According to a first aspect of the present disclosure, there is provided a charging receptacle which may comprise a socket configured to receive a charging plug, a first terminal fixed in the socket, and a receptacle ejection device arranged in the socket. The receptacle ejection device is configured to automatically separate the charging receptacle from the charging plug after charging of an apparatus to be charged (e.g. a chargeable apparatus) is completed.

According to an embodiment of the present disclosure, the receptacle ejection device may comprise one or more solenoids and one or more first magnets respectively corresponding to the one or more solenoids, the first magnets being arranged below the corresponding solenoids and close to the opening of the socket.

According to another embodiment of the present disclosure, the one or more solenoids may be connected to the corresponding one or more first magnets, and when the charging receptacle is connected to the charging plug, the one or more solenoids are connected to the charging plug via the corresponding one or more first magnets.

According to another embodiment of the present disclosure, the one or more solenoids may be two solenoids. The two solenoids are wound in opposite directions and connected in series with the first terminal and a battery of the apparatus to be charged.

According to a further embodiment of the present disclosure, ends of the first magnets which are close to the opening of the socket may have a first polarity (e.g. N-pole), and ends of the two solenoids which are close to the corresponding first magnets have a second polarity upon energization (e.g. S-pole). The first polarity is opposite to the second polarity. In particular, the first polarity may be an N-polarity and the second polarity may be an S-polarity. Alternatively, in one example, the first polarity may be an S-polarity and the second polarity may be an N-polarity.

According to embodiments of the present disclosure, the charging receptacle may be connected to a mains supply, for example as a receptacle in the wall.

Alternatively, the charging receptacle may be arranged as a charging slot of the apparatus to be charged.

A second aspect of the present disclosure provides a charging plug that may comprise a second terminal and a plug ejection device configured to automatically separate the charging receptacle from the charging plug after charging of the apparatus to be charged is completed.

According to an embodiment of the present disclosure, the plug ejection device may comprise one or more second magnets.

According to another embodiment of the present disclosure, the one or more second magnets may comprise two second magnets.

According to a further embodiment of the present disclosure, ends of the two second magnets which are close to the outside of the charging plug may have a first polarity.

In one example, the first polarity may be an N-polarity. At that time, an end of the solenoid which is close to the first magnet is an S-pole upon energization.

In another embodiment, the receptacle ejection device of the charging receptacle and the plug ejection device of the charging plug may have opposite configurations. That is, the plug ejection device may comprise one or more solenoids and one or more first magnets respectively corresponding to the one or more solenoids, and the one or more first magnets are arranged below the corresponding solenoids and close to the outside of the charging plug. The receptacle ejection device may comprise one or more second magnets close to the opening of the socket. Moreover, the one or more second magnets of the receptacle ejection device may be two second magnets. Ends of the two second magnets which are close to the opening of the socket may have a first polarity, such as an N-polarity. Correspondingly, the one or more solenoids of the plug ejection device are connected to the corresponding one or more first magnets, and when the charging plug is connected to the charging receptacle, the one or more solenoids are connected to the charging receptacle via the corresponding one or more first magnets. In one example, the one or more solenoids may be two solenoids which are wound in opposite directions and are connected in series with the second terminal of the charging plug. In another example, ends of the first magnets which are close to the outside of the charging receptacle may have a first polarity, and ends of the two solenoids which are close to the corresponding first magnets have a second polarity upon energization. The first polarity is opposite to the second polarity, for example, the first polarity is an N-polarity and the second polarity is an S-polarity.

According to a third aspect of the present disclosure, there is provided a charging system which may comprise a charging receptacle and a charging plug that is connected in a pluggable manner to the charging receptacle. When the charging plug is inserted into the charging receptacle, a first terminal of the charging receptacle is connected to a second terminal of the charging plug for charging a apparatus to be charged, and a receptacle ejection device of the charging receptacle cooperates with a plug ejection device of the charging plug so as to automatically separate the charging receptacle from the charging plug after charging of the apparatus to be charged is completed.

In the above embodiment, there is a repulsive force between the first magnet and the second magnet. When the apparatus to be charged is being charged, the energization direction of the one or more solenoids causes the one or more solenoids to generate an attractive force on the second magnet, so that the first terminal and the second terminal are connected to each other. Moreover, the attractive force gradually decreases with the progress of charging of the apparatus to be charged, but the attractive force is always greater than a threshold value during charging. When charging of the apparatus to be charged is to be completed, the attractive force decreases to less than the threshold value, thereby automatically separating the charging receptacle from the charging plug.

According to embodiments of the present disclosure, the threshold value may be the repulsive force between the first magnet and the second magnet plus the frictional force that needs to be overcome to connect the first terminal to the second terminal.

BRIEF DESCRIPTION OF DRAWINGS

These and other aspects of the present disclosure will now be described in more detail with reference to the accompanying drawings which illustrate embodiments of the present disclosure. In the drawings.

In the figures, the same reference numerals denote the same elements.

DETAILED DESCRIPTION

The present disclosure will now be described more comprehensively below with reference to the accompanying drawings, in which the presently preferred embodiments of the present disclosure are shown. However, the present disclosure may be embodied in many different forms and should not be construed as being limited to the embodiments set forth herein; rather, these embodiments are provided for completeness and thoroughness and for the purpose of providing the skilled person with a comprehensive view of the scope of the present disclosure.

As used herein, the term "solenoid" refers to a multi-wound wire, which may be hollow inside, or may have a metal core. When there is current passing through the wire, a uniform magnetic field would be generated inside the solenoid. At that time, the solenoid can be used as an electromagnet. The polarity of the solenoid is related to the winding direction of the solenoid and the direction of the current flowing through the solenoid. The relationship between them can be determined using the right-hand screw rule. For a given solenoid (i.e. with a definite winding direction), the polarity of the energized solenoid changes as the current direction changes. As used herein, the term "polarity" refers to the polarity of the magnetic field of the energized solenoid or magnet, i.e. N-pole or S-pole. Therefore, by controlling the direction and magnitude of the current that flows through the solenoid, the polarity of the solenoid and the intensity of the magnetic field can be controlled.

Figure 1:
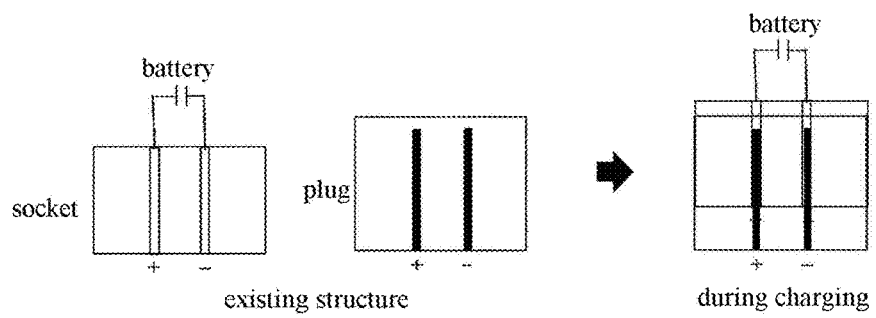
FIG. 1 illustrates a typical charging receptacle, a typical charging plug and a typical charging process.

As shown in FIG. 1, the typical cooperation of a charging receptacle and a charging plug upon charging is schematically illustrated. When the charging receptacle is connected to the charging plug, their respective positive and negative pins are connected in series to form a loop to charge the battery via the power supply. There is a risk that the battery will burn or even explode in the charging system.

Figure 2:
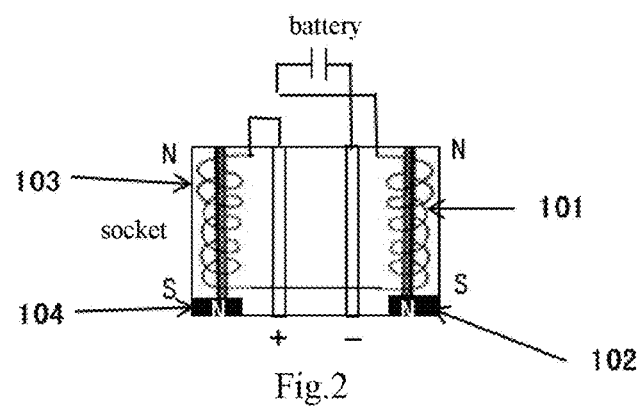
FIG. 2 illustrates a schematic view of a charging receptacle according to an embodiment of the present disclosure.

FIG. 2 illustrates a charging receptacle according to embodiments of the present disclosure. The charging receptacle comprises a socket configured to receive a charging plug, a first terminal (including an anode and a cathode) fixed in the socket, and a receptacle ejection device arranged in the socket. The receptacle ejection device is configured to automatically separate the charging receptacle from the charging plug after charging of an apparatus to be charged is completed.

By arranging the receptacle ejection device in the socket of the charging receptacle, it is possible to avoid excessive charging of the battery resulting from the problems such as system misjudgment, thereby reducing the risk that the battery burns even explodes. The receptacle ejection device may optionally assist in fixing the charging plug in the charging receptacle while the apparatus to be charged is being charged, and automatically separate the charging plug from the charging receptacle when charging of the apparatus to be charged is finished.

For example, as shown in FIG. 2, the receptacle ejection device in the charging receptacle includes solenoids 101, 103 and first magnets 102, 104. The two solenoids 101, 103 are arranged in the socket and are connected in series with the battery and the first terminal. The two solenoids 101, 103 are wound in opposite directions. The two first magnets 102, 104 are arranged respectively close to the opening of the charging receptacle and below the solenoids 101, 103, ends of which away from the solenoids are N-poles. When the battery is not being charged, the two solenoids 101, 103, the first terminal and the battery do not form a loop. When the charging plug is connected to the charging receptacle so as to charge the battery, current forms a loop and passes through the anode, the solenoid 103, the solenoid 101, the battery and the cathode successively, such that two ends of the two solenoids have polarities. Since the coils of the solenoids 101, 103 are wound in opposite directions and the currents that flow through them are opposite in direction, it is possible to determine that the two solenoids 101, 103 have the same polarity at the upper ends and the same polarity at the lower ends according to the right-hand screw rule, For example, as shown in FIG. 2, the upper ends of the solenoids 101, 103 are N-poles and the lower ends thereof are S-poles.

Since facing ends of the solenoids 101, 103 and the corresponding first magnets 102, 104 have the same polarity (i.e. S-pole) when the solenoids are being energized, the solenoid and the corresponding first magnet are mutually repulsive. Thus, the solenoid and the corresponding first magnet can be fixed to each other to prevent relative displacement therebetween.

In one example, the above-described charging receptacle may be connected to the mains supply, for example as a receptacle in the wall. The electric power from the mains supply is supplied to the apparatus to be charged through the charging receptacle and the charging plug fixed in the charging receptacle so as to charge the battery of the apparatus to be charged.

Alternatively, the above charging receptacle may be arranged as a charging slot of the apparatus to be charged. The electric power from a power supply (e.g. mains supply) reaches the charging slot of the apparatus to be charged through a charging line and the charging plug, thereby charging the apparatus to be charged.

It is to be noted that the arrangement shown in FIG. 2 is merely an example. Other arrangements may also be employed, for example, ends of the first magnets 102, 104 away from the solenoids are S-poles, while the upper ends of the solenoids 101,103 are S-poles and the lower ends thereof are N-poles. In addition, those skilled in the art can select the numbers of solenoids and first magnets based on actual needs, which are not limited to two solenoids and two first magnets.

Figure 3:
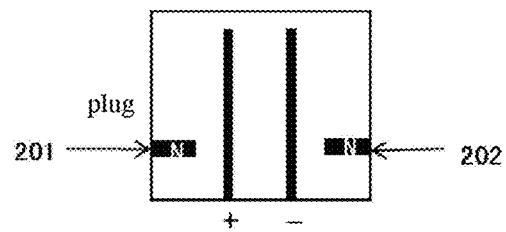
FIG. 3 illustrates a schematic view of a charging plug according to another embodiment of the present disclosure.

FIG. 3 illustrates a structural schematic view of a charging plug according to embodiments of the present disclosure. The charging plug may comprise a second terminal and a plug ejection device configured to automatically separate the charging receptacle from the charging plug after charging of the apparatus to be charged is completed. The plug ejection device may cooperate with the receptacle ejection device of the charging receptacle in the above embodiment to avoid excessive charging of the battery resulting from the problems such as system misjudgment, thereby reducing the risk that the battery burns even explodes. The plug ejection device may also optionally assist in fixing the charging plug in the charging receptacle while the apparatus to be charged is being charged, and automatically eject the charging plug from the charging receptacle when charging of the apparatus to be charged is finished.

Specifically, as shown in FIG. 3, the charging plug may comprise two second magnets 201, 202 for cooperating with the solenoids 101, 103 and the first magnets 102, 104 as shown in FIG. 2 so as to effect automatic ejection of the charging plug after charging of the apparatus to be charged is completed.

The two second magnets may correspond to the two solenoids and the two first magnets as described in the first aspect of the present disclosure, respectively. When the charging receptacle is connected to the charging plug, the first magnet and the corresponding second magnet are close to each other.

When the charging plug according to the present embodiment is connected to the charging receptacle as described in the first aspect of the present disclosure, an end of the second magnet facing the first magnet may have a polarity which is the same as that of an end of the first magnet close to the second magnet and opposite to that of an end of the solenoid close to the second magnet. For example, when the charging plug is connected to the charging receptacle to thereby charge the battery, the solenoid is energized, thus it can have a second polarity at an end close to the first and second magnets. At that time, the solenoid and the second magnet attract each other, and the first magnet and the second magnet are mutually repulsive. Accordingly, when the battery is being charged, the solenoid and the first magnet generate a force with an opposite direction on the second magnet. By appropriately configuring the solenoid, the first magnet and the second magnet, the attractive force of the solenoid on the second magnet during charging can be greater than the repulsive force of the first magnet on the second magnet plus the frictional force that needs to be overcome to connect the first terminal to the second terminal. In general, the charging receptacle and the charging plug attract each other, thereby facilitating charging of the battery. The battery of the apparatus to be charged is equivalent to a capacitor. When the battery of the apparatus to be charged is being charged, the charging capacity of the battery is gradually increasing, while the charging current is gradually reducing. When the charging is completed, the charging current is zero. As known to those skilled in the art, the greater the current flowing through the solenoid is, the stronger the intensity of the magnetic field generated by the solenoid is, and hence the greater the attractive force on the second magnet is. Upon charging, the current flowing through the solenoid causes the solenoid to generate an attractive force on the second magnet, thereby drawing the plug into the receptacle by overcoming the repulsive force of the first magnet on the second magnet plus the frictional force that needs to be overcome to connect the first terminal to the second terminal. When charging is completed, the charging current is reduced to zero, thus the solenoid does not generate an attractive force on the second magnet. As a result, the repulsive force generated by the first magnet on the second magnet ejects the plug. The repulsive force between the first magnet and the second magnet exists throughout and remains constant, and the attractive force between the solenoid and the second magnet varies with the current.

In FIG. 3, ends of the second magnets 201, 202 which are close to the outside of the charging plug are shown as N-poles. However, it is to be noted that ends of the second magnets 201, 202 which are close to the outside of the charging plug may also be S-poles.

Figure 4:
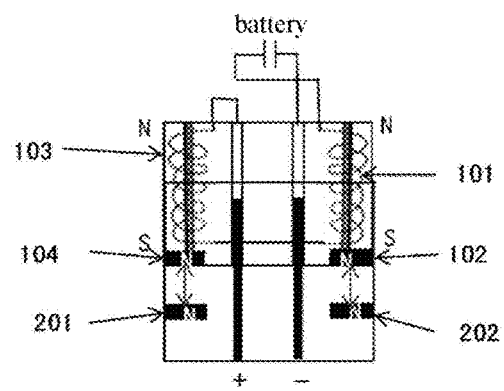
FIG. 4 illustrates a schematic view in which a charging receptacle and a charging plug according to embodiments of the present disclosure start to contact each other.

FIG. 4 illustrates the situation that the charging receptacle shown in FIG. 2 and the charging plug shown in FIG. 3 just come into contact with each other and have not yet begun to charge the battery. Since facing ends of the first magnet and the second magnet have the same polarity (e.g. both N-poles), the first magnets 104 and 102 will be repulsive to 201, 202 respectively, as indicated by the arrows in FIG. 4. Assuming that the repulsive force generated by the two magnets at that time is $F_{repulsion}$, the value of $F_{repulsion}$ is constant and the magnitude thereof is decided by the properties of the first and second magnets themselves. The repulsive force exists at the instant when the charging plug comes into contact with the charging receptacle, and lasts all the time.

Figure 5:
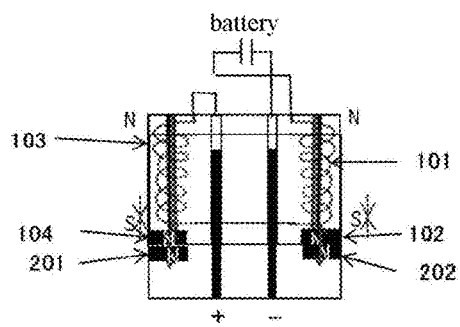
FIG. 5 illustrates a schematic view in which an apparatus to be charged according to embodiments of the present disclosure is being charged.
Figure 6:
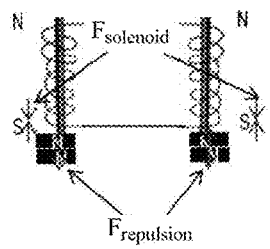
FIG. 6 illustrates various forces in a charging system according to embodiments of the present disclosure when the apparatus to be charged is being charged.
Figure 7:
FIG. 7 illustrates the directions of the forces between the solenoid, the first magnet, and the second magnet according to embodiments of the present disclosure.

FIGS. 5 and 6 illustrate the charging receptacle shown in FIG. 2 and the charging plug shown in FIG. 3 when the apparatus to be charged is being charging. During this period, $F_{repulsion}$ always exists and remains constant. Since the charging plug and the charging receptacle form a loop, the current flows through the solenoids 101, 103. The solenoids 101, 103 would generate a magnetic field after being energized. According to the right-hand screw rule, the current flows from the solenoid 103 to the solenoid 101, such that the lower ends of the two solenoids are S-poles and the upper ends thereof are N-poles. At that time, the two solenoids 103, 101 will generate an attractive force $F_{solenoid}$ on the second magnets 201, 202 of the charging plug. FIG. 7 schematically illustrates the directions of the forces between the solenoid, the first magnet, and the second magnet.

It is to be noted that, in addition to the repulsive force $F_{repulsion}$ between the first magnet and the second magnet, during charging, the attractive force $F_{solenoid}$ of the solenoid on the second magnet also needs to overcome other resistances to connect the first terminal to the second terminal, such as a frictional force. Therefore, in practice, during charging, the solenoid generates an attractive force on the second magnet, so that the first terminal and the second terminal are connected to each other. The attractive force gradually decreases with the progress of charging of the apparatus to be charged, but it is always greater than a threshold value during charging. The threshold value is the repulsive force between the first magnet and the second magnet plus the frictional force that needs to be overcome to connect the first terminal to the second terminal. However, in the drawings, since the frictional force is relatively small with respect to the attractive force and the repulsive force, it is not shown for the sake of clarity.

According to the field intensity formula $B_0 = \mu_0 NI_M$ of an energized solenoid, where $B_0$ is the field intensity, $\mu_0$ is the permeability, N is the number of turns of the solenoid coil, and $I_M$ is the charging current, the number of turns of the solenoid coil can be adjusted to ensure that the attractive force is always greater than the threshold value during the charging process. In practical applications, the relationship between the solenoid coil and the magnetic force is related to various factors such as the parameters of the apparatus to be charged, the coil material, the coil diameter, the coil thickness, and the like, which may be selected and designed by those skilled in the art based on actual needs.

Figure 8:
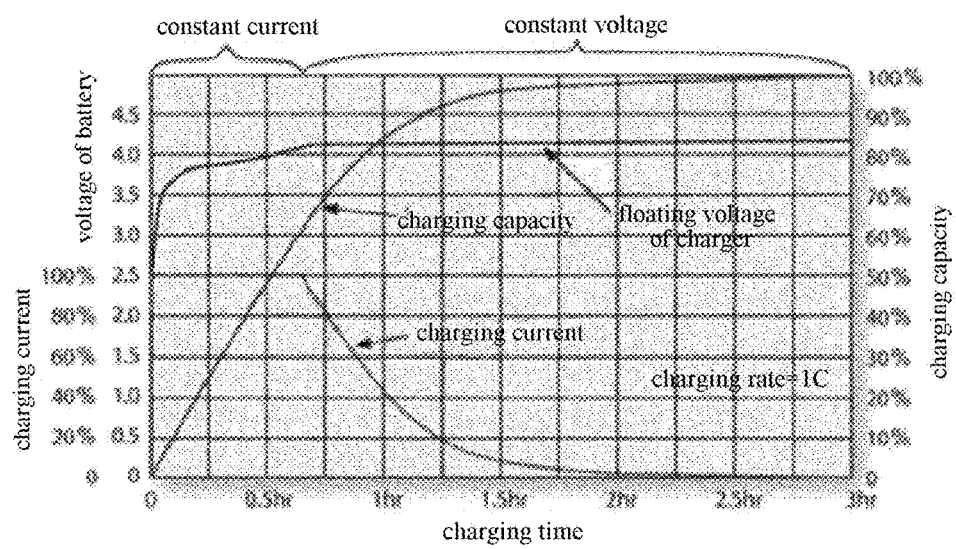
FIG. 8 illustrates curves showing variations in the charging capacity and the charging current of the battery with time during the charging process.

FIG. 8 illustrates curves showing variations in the charging capacity and the charging current of the battery with time during the charging process. It can be seen that the charging current gradually decreases as the charging capacity gradually increases. When the charging time is 2 hr, the charging capacity is close to 97% and the current is only 3% of the initial current. At that time, with gradual decrease in the current, the magnetic field generated by the two solenoids is gradually reduced, thus the attractive force generated on the charging plug also gradually decreases.

Figure 9:
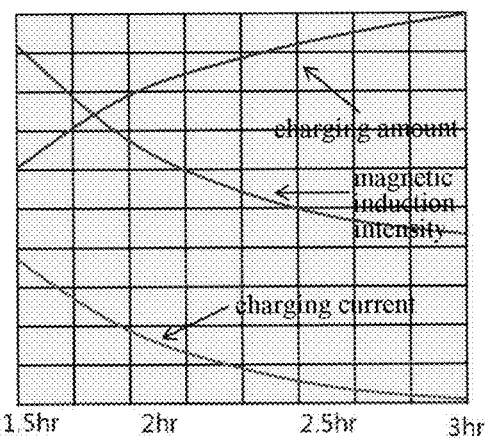
FIG. 9 illustrates curves showing variations in the charging current, the charging amount of the battery and the magnetic induction intensity of the solenoid with time during the charging process.
Figure 10:
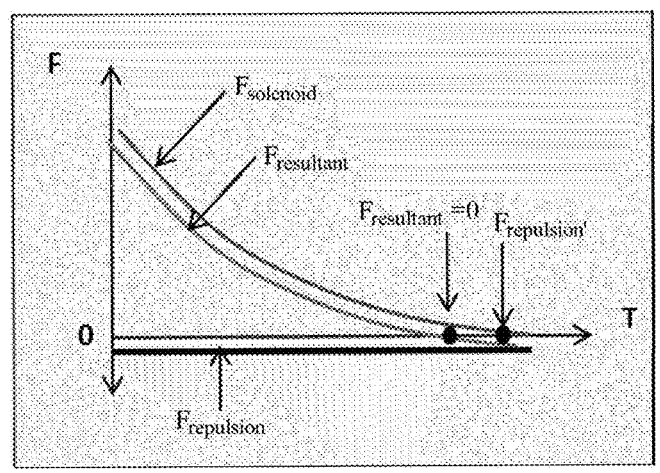
FIG. 10 illustrates curves showing variations in various forces in the charging system according to embodiments of the present disclosure with time.

FIG. 9 specifically illustrates curves showing variations in the charging current, the charging amount of the battery and the magnetic induction intensity of the solenoid with time during the charging process. According to the field intensity formula $B_0 = \mu_0 NI_M$, as shown in FIG. 9, the magnetic induction intensity decreases linearly as the current decreases progressively, and the magnetic force $F_{solenoid}$ generated by the solenoid on the second magnet also decreases progressively as the magnetic induction intensity decreases progressively. As shown in FIG. 10, $F_{solenoid}$ decreases progressively. In this process, since there further exist the magnetic force $F_{repulsion}$ generated by the first magnet on the second magnet, and the frictional force that needs to be overcome to connect the first terminal to the second terminal, an acting force $F_{resultant}$ is generally generated on the second magnet. Since $F_{repulsion}$ and the frictional force are constant, the trend of variation in $F_{resultant}$ is the same as the trend of variation in $F_{solenoid}$. In the left circle of FIG. 10, $F_{resultant} = 0$. At that time, the charging current of the system is close to zero. At this time point, the battery basically completes the charging process (97% to 99%), the current approaches the minimum value, and there is no acting force between the charging plug and the charging receptacle. Then, the charging current continues to decrease until it is 0 (the right circle). At that time, $F_{solenoid} = 0$, leaving only constant $F_{repulsion}$ and frictional force. That is to say, the charging plug would be subjected to a repulsive force from the charging receptacle at that time, thus the charging plug is automatically ejected to stop charging the battery.

Embodiments of the present disclosure provide a technique for charging a battery of a chargeable apparatus, in which the charging receptacle and the charging plug are improved so that the charging plug can be ejected automatically after charging is completed, which avoids the risk that the battery burns even explodes resulting from excessive charging of the battery, and is relatively simple to realize.

Those skilled in the art will recognize that the present disclosure is by no means limited to the example embodiments described above. Rather, many modifications and variations are possible within the scope of the appended claims. For example, in another embodiment, the receptacle ejection device of the charging receptacle and the plug ejection device of the charging plug may have opposite configurations. That is, the plug ejection device may comprise one or more solenoids and one or more first magnets respectively corresponding to the one or more solenoids, and the one or more first magnets are arranged below the corresponding solenoids and close to the outside of the charging plug. The receptacle ejection device may comprise one or more second magnets close to the opening of the socket, and the one or more second magnets of the receptacle ejection device may be two second magnets. Ends of the two second magnets which are close to the opening of the socket may have a first polarity, such as an N-polarity. Correspondingly, the one or more solenoids of the plug ejection device are connected to the corresponding one or more first magnets, and when the charging plug is connected to the charging receptacle, the one or more solenoids are connected to the charging receptacle via the corresponding one or more first magnets. In one example, the one or more solenoids may be two solenoids which are wound in opposite directions and are connected in series with the second terminal of the charging plug. In another example, ends of the first magnets which are close to the outside of the charging receptacle may have a first polarity, and ends of the two solenoids which are close to the corresponding first magnets have a second polarity upon energization. The first polarity is opposite to the second polarity, for example, the first polarity is an N-polarity and the second polarity is an S-polarity. In addition, the receptacle ejection device and the plug ejection device are not limited to using solenoids and magnets, whereas other devices for ejecting the charging plug after charging is completed may also be used.

The present disclosure can be widely applied to various chargeable apparatuses including mobile phones, tablet computers, cameras, and other apparatuses that require their batteries to be charged.

In addition, variations of the disclosed embodiments may be understood and effected by those skilled in the art in practicing the claimed disclosure, by studying the drawings, the disclosure, and the appended claims. In the claims, the word "comprising" does not exclude other elements or steps. The mere fact that certain measures are recited in mutually different dependent claims does not indicate that a combination of these measures cannot be used to advantage.

The invention claimed is:

1. A charging receptacle, comprising a socket configured to receive a charging plug, a first terminal fixed in the socket, and a receptacle ejection device arranged in the socket and configured to automatically separate the charging receptacle from the charging plug after charging of an apparatus to be charged is completed,
wherein the receptacle ejection device comprises one or more solenoids and one or more first magnets respectively corresponding to the one or more solenoids, the one or more first magnets being arranged below and outside of corresponding solenoids and close to an opening of the socket.

2. The charging receptacle according to claim 1, wherein the one or more solenoids are connected to corresponding one or more first magnets, and when the charging receptacle is connected to the charging plug, the one or more solenoids are connected to the charging plug via the corresponding one or more first magnets.

3. The charging receptacle according to claim 1, wherein the one or more solenoids are two solenoids, the two solenoids being wound in opposite directions and connected in series with the first terminal and a battery of the apparatus to be charged.

4. The charging receptacle according to claim 3, wherein the or more first magnets have a first polarity at an end close to the opening of the socket, and the two solenoids have a second polarity upon energization at ends close to corresponding first magnets, the first polarity being opposite to the second polarity.

5. The charging receptacle according to claim 1, wherein the charging receptacle is connected to a mains supply.

6. The charging receptacle according to claim 1, wherein the charging receptacle is arranged as a charging slot of the apparatus to be charged.

7. A charging plug, comprising a second terminal and a plug ejection device configured to automatically separate the charging receptacle from the charging plug after charging of an apparatus to be charged is completed,
wherein
the plug ejection device comprises one or more second magnets;
the charging plug is connected in a pluggable manner to the charging receptacle according to claim 1;
there is a repulsive force between the first magnets and the second magnets;
when the apparatus to be charged is being charged, the energization direction of the one or more solenoids causes the one or more solenoids to generate an attractive force on the second magnets so that the first terminal and the second terminal are connected to each other, and the attractive force gradually decreases with the progress of charging of the apparatus to be charged, but the attractive force is always greater than a threshold value during charging; and
when charging of the apparatus to be charged is completed, the attractive force decreases to less than the threshold value so that the charging receptacle is automatically separated from the charging plug.

8. The charging plug according to claim 7, wherein the one or more second magnets are two second magnets wherein the two second magnets have a first polarity at ends close to the outside of the charging plug.

9. The charging plug according to claim 7, wherein the one or more solenoids are two solenoids, the two solenoids being wound in opposite directions and connected in series with the second terminal.

10. The charging plug according to claim 9, wherein the first magnets have a first polarity at ends close to the outside of the charging receptacle, and the two solenoids have a second polarity upon energization at ends close to corresponding first magnets, the first polarity being opposite to the second polarity.

11. A charging system, comprising a charging receptacle according to claim 1 and a charging plug which is connected in a pluggable manner to the charging receptacle, the charging plug comprising a second terminal and a plug ejection device configured to automatically separate the charging receptacle from the charging plug after charging of an apparatus to be charged is completed,
when the charging plug is inserted into the charging receptacle, a first terminal of the charging receptacle being connected to a second terminal of the charging plug so as to charge an apparatus to be charged, the receptacle ejection device of the charging receptacle cooperating with the plug ejection device of the charging plug so as to automatically separate the charging receptacle from the charging plug after charging of the apparatus to be charged is complete,
wherein the plug ejection device comprises one or more second magnets;
wherein
there is a repulsive force between the first magnets and the second magnets;
when the apparatus to be charged is being charged, the energization direction of the one or more solenoids causes the one or more solenoids to generate an attractive force on the second magnets, so that the first terminal and the second terminal are connected to each other, and the attractive force gradually decreases with the progress of charging of the apparatus to be charged, but the attractive force is always greater than a threshold value during charging;
when charging of the apparatus to be charged is completed, the attractive force decreases to less than the threshold value so that the charging receptacle is automatically separated from the charging plug.

12. The charging system according to claim 11, wherein the threshold value is the repulsive force between the first magnets and the second magnets plus a frictional force that needs to be overcome to connect the first terminal to the second terminal.

* * * * *